April 21, 1964     J. S. FREISMUTH     3,129,885

FLUID LINE THERMOSTAT

Filed April 30, 1962     2 Sheets-Sheet 1

INVENTOR.
JOHN S. FREISMUTH
BY
WILSON, SETTLE & CRAIG
ATTORNEYS

April 21, 1964     J. S. FREISMUTH     3,129,885
FLUID LINE THERMOSTAT
Filed April 30, 1962     2 Sheets-Sheet 2
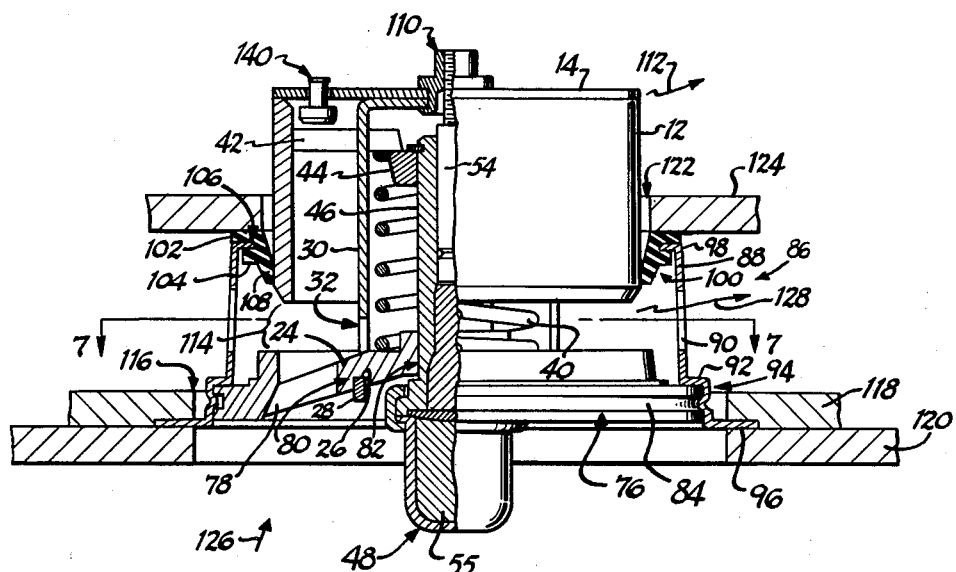
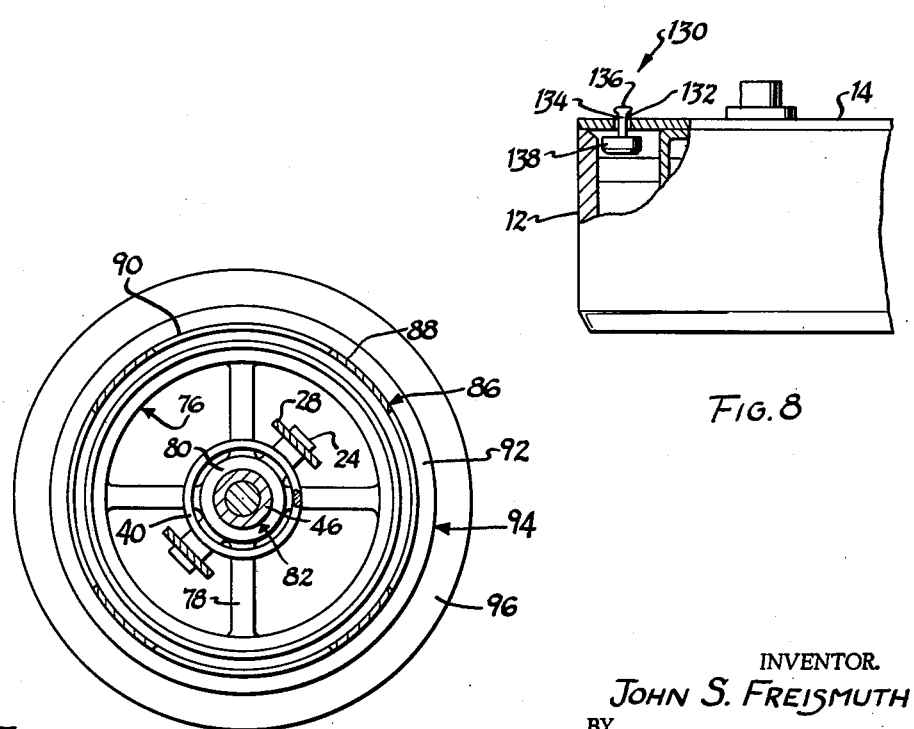
INVENTOR.
JOHN S. FREISMUTH
BY
WILSON, SETTLE & CRAIG
ATTORNEYS United States Patent Office 3,129,885
Patented Apr. 21, 1964

3,129,885
FLUID LINE THERMOSTAT
John S. Freismuth, Arlington Heights, Ill., assignor to American Radiator & Standard Sanitary Corporation, New York, N.Y., a corporation of Delaware
Filed Apr. 30, 1962, Ser. No. 191,173
9 Claims. (Cl. 236—34.5)

This invention relates to a fluid line thermostat, as, for example, a thermostat for controlling or apportioning the flow of engine coolant between the coolant jacket of an internal combustion engine and the engine radiator.

This application is a continuation-in-part of co-pending application Serial Number 71,987, filed November 28, 1960, now Patent 3,071,311, issued December 25, 1962.

One object of the present invention is to provide a rugged high strength thermostat which may be formed at least partly by low cost die casting procedures, the arrangement being characterized in that simplified single action dies and forming procedures may be employed in the manufacturing operations.

A further object is to provide a satisfactorily operating thermostat which can be formed with little or no machining of the parts.

An additional object is to provide a thermostat wherein the component parts can be easily assembled together and calibrated.

A general object of the invention is to provide a thermostat which combines the desired advantages of satisfactory temperature control under operational extremes, rugged construction, and low manufacturing cost.

Another object is to provide a thermostat that incorporates a bridge structure adapted to support a resilient annular seal element and thereby provide a self-contained structure complete with seal and sleeve for improved installation and repair.

Another object is to provide a thermostat having an air vent and liquid flow control valve modification for improved operation and more rapid thermal response.

Another object is to provide an improved fluid flow thermostat having self-contained sleeve and seal structures.

Another object is to provide an improved fluid flow thermostat adapted to a wide range of operating temperatures.

A further object is to provide a fluid flow thermostat having improved free-flow characteristics and quick and sensitive thermal response.

Other objects of this invention will appear in the following description and appended claims, reference being had to the accompanying drawings forming a part of this specification wherein like reference characters designate corresponding parts in the several views.

In the drawings:

FIG. 6 is an elevattional view with one side broken away in section to illustrate both exterior and interior configurations of a second embodiment of the invention;

FIG. 7 is a section view taken along line 7—7 of FIG. 6; and

FIG. 8 is a fragmentary view partially in section illustrating a desirable air vent and liquid flow control valve (fluid vent and valve) modification applicable to use with the embodiments of FIGS. 1–5 or 6–7.

Figure 1:
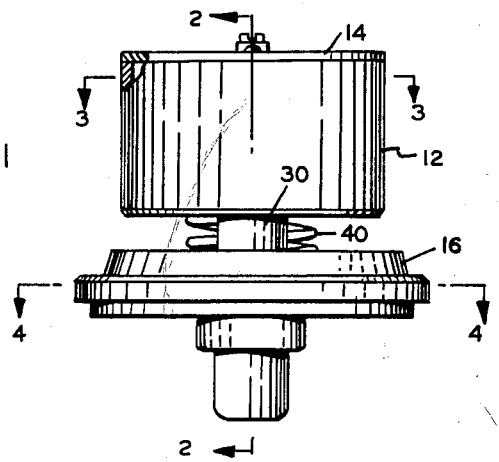
FIG. 1 is a side elevational view of one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

THE ENVIRONMENT

Briefly the thermostat of the present invention will be described with reference to use in an internal combustion engine typified by an automobile engine; and for such purpose, the invention serves to control flow of liquid coolant in the engine either for by-pass recirculation during warm-up or for flow of the radiator to provide cooling and safe and efficient operation; or for a partial flow between the engine and radiator if operating and cooling conditions call for such.

Thus the thermostat is associated with the cooling jacket of the engine, with the power element thereof exposed to direct engine coolant temperatures. The unit is positioned to extend through a secondary spaced engine wall for sealed cooperation therewith. Thus, when the secondary wall is closed, flow to the radiator will be blocked off and the coolant by-passed back to the engine for fast warm-up.

When the engine is up to operating temperature, however, the thermostat of the invention opens flow through the secondary wall, closing by-pass to the engine jacket, and thus directs the coolant to the radiator to thereby cool the coolant and retain the engine at proper operating temperatures.

With the foregoing brief introduction, the various embodiments of the invention will now be described.

THE INVENTION

The Embodiment of Figures 1–5

Referring to the drawings, there is shown a thermostat of the by-pass type wherein coolant from the jacket of an internal combustion engine (not shown) enters from below the thermostat and is directed either to the engine radiator or to a by-pass around the radiator, depending on the position of the thermostat tubular metering valve 12.

Figure 2:
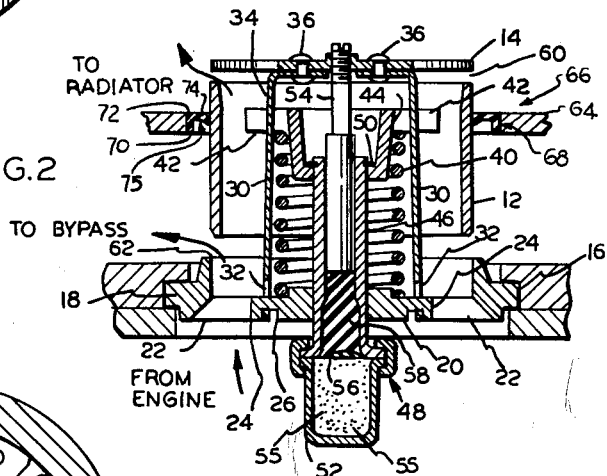
FIG. 2 is a sectional view on line 2—2 in FIG. 1.
Figure 4:
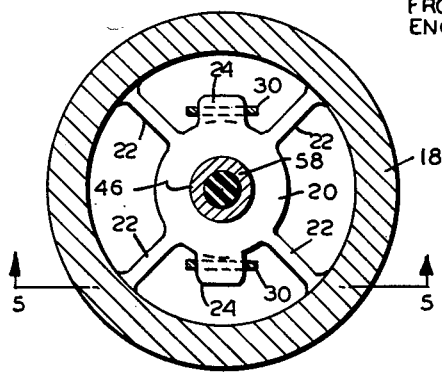
FIG. 4 is a sectional view on line 4—4 in FIG. 1.
Figure 5:
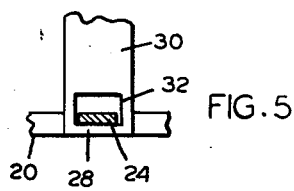
FIG. 5 is a fragmentary view on line 5—5 in FIG. 4.

As shown in FIG. 2 tubular valve 12 is axially movable between a seat-forming disc or wall structure 14 and a second seat-forming wall structure 16. Structure 16 comprises a peripheral thermostat-mounting portion 18 and a central portion 20, said portions being integrally interconnected by the four spoke walls 22. Central portion 20 includes two outwardly extending lugs 24, each of which is provided with an undercut at 26 to receive the retainer-forming end portion 28 of a strap or tie element 30. Each strap 30 is provided with an opening 32 therein to provide the specified retainer end portion.

As shown in the illustrative drawings the straps 30 are formed as legs of a U-shaped strip 34, the web portion of which is secured to disc 14, as by rivets or other fastening means 36. The strap 34-disc 14 assembly may be installed onto wall structure 16 by merely moving the assembly downwardly with the lower ends of straps 30 passing outside of lugs 24, and then pinching the straps toward one another so that the openings 32 pass around the lugs. The retainer portions 28 then may seat in cut outs 26 to retain the disc 14 and wall structure 16 in their desired assembled positions. A compression spring 40, to be described hereinafter, automatically exerts a tension on straps 30 to maintain the retainer portions 28 in cutaway areas 26 after complete assembly of the component parts. The complete sequence of assembly operations will be described hereinafter.

Referring now to valve 12, said valve will be seen from

Figure 3:
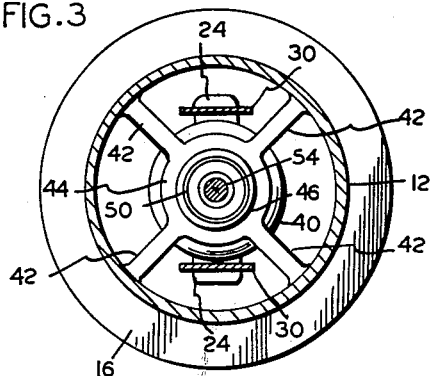
FIG. 3 is a sectional view on line 3—3 in FIG. 1.

FIG. 3 to be provided with four integral spokes 42 which extend inwardly to a hub portion 44. As best shown in FIG. 2, an opening is formed through hub portion 44 to receive the sleeve portion 46 of a thermostatic power element 48. A retainer ring 50 may be provided to retain the sleeve against downward movement relative to the hub 44.

The thermostatic power element is of conventional construction and comprises the aforementioned sleeve 46, a cup-like container 52, and a piston 54. The space within container 52 is occupied by a pellet 55 comprised of a mixture of solid thermostatic expansion material such as wax and dispersed heat-conductive particles such as copper or aluminum. As is conventional, a rubber diaphragm 56 and rubber plug 58 may be employed to transmit the volumetric expansion of the cup contents to the piston.

The upper end portion of the piston is secured to the disc 14, as by the cooperating threads and solder (not shown), and sleeve 46 is free to slide within portion 20 of structure 16. Therefore when the thermostat is installed in the coolant circulating portions of an engine any appreciable thermal expansion of pellet 55 will cause the entire assembly of members 46, 52 and 12 to move downwardly away from the seat-forming disc 14 to thus increase the coolant flow past seat 60 and decrease the coolant flow past seat 62. When sufficient coolant has been directed through the radiator to reduce the engine temperature to its desired equilibrium value the changed coolant temperature will cause a contraction in the pellet 55 volume such that spring 40 is enabled to return members 46, 52 and 12 toward seat 60. In this way the engine is maintained at a relatively constant value, safely low enough to prevent heat damage and high enough for efficient performance.

The tubular nature of element 12 is important in that it enables the valve element to be moved with lesser interference from the fluid than in the case of conventional poppet valve. Thus, the fluid opposes movement of the tubular valve only by reason of the fluid pressures developed on the narrow edges of the tubular element at its opposed ends. The areas presented by these edges are relatively small, and the fluid force in pounds on the valve to retard it is therefore necessarily of small magnitude. In addition, the fluid forces act on the opposite ends of the tubular valve and tend to oppose one another, so that in practice very little fluid force is present to oppose movement of the valve in either direction. Because of this fact a relatively light spring can be used for spring 40, and the component parts of the thermostatic power element can be reduced in size, thereby reducing costs of the assembly.

It will be noted from FIG. 2 that tubular element 12 is of slightly less major diameter than the internal diameter of seat 62 so that on fluid temperature increase the tubular element will slide within seat surface 62. By this arrangement the flow to the by-pass will be substantially cut off while the tubular valve element still has a potential of further downward movement. This is of advantage in that it eliminates any possibility of parts damage such as might otherwise occur if thermostat pellet 55 were to continue to want to expand after the tubular valve element had seated to close the by-pass.

By a study of the figures it will be seen that structure 16 can be economically formed by a simple die casting operation; similarly the assembly of elements 12, 42 and 44 can be economically formed by a simple die casting operation. For most applications the tolerances achieved with die casting operations are sufficient so that no machining of the parts is required.

The previous description has dealt to some degree on the method of assembling disc structure 14 to the wall structure 16. It will be understood that prior to such assembly operations the thermostatic power element 48 is first inserted upwardly through structure 16, spring 40 is then positioned around the power element, and the tubular valve element structure is then secured to sleeve 46 by insertion of the locking ring 50 therearound. The spring force automatically holds the enlarged portion of the power element against the underside of structure 16 such that the parts assume substantially stable positions during assembly of the disc 14 and straps 30 into the thermostat.

The disc may be brought to a designated position by first screwing piston 54 a short distance onto the disc and then attaching the straps to lugs 24 as previously described. The final calibrating adjustment of parts may be made by further screwing up of the piston while the thermostat is located in a water bath. A solder connection between the disc and piston serves to retain the thermostat calibration. The connecting and calibrating operations may be easily performed from easily accessible areas above the thermostat.

*The By-Pass Seal and Its Function*

As shown in FIGURE 2, the tubular metering valve 112 passes through a secondary engine wall 64 and seats against the disc 14. In view of the fact that disc 14 is positioned beyond wall 64, flow to the radiator is provided by control beyond the secondary engine wall 64, as the valve 12 contacts or moves away from disc 14, per FIGURE 2.

Leakage around the exterior of the metering valve 12 through the secondary engine wall 64 to the radiator will result in a cold engine. Therefore, to avoid this contingency, an elastomeric sealing element 66 is positioned in an aperture 68 of wall 64. It will be noted that the sealing element 66 has an internal diameter to snugly and slidably engage the exterior of the metering valve 12.

Upon further consideration, it will be noted that the elastomeric sealing element 66 includes a cylindrical wall 70, suitably secured within the opening 68 as by bonding, and the cylindrical wall 70 is joined with a radially extending annulus 72, at one end. It will be noted that at the interior of the radial annulus 72, there is joinder to an inverted frusto-conical wall 74 that forms a wiping lip 75 for sealing against the exterior of valve 12.

It will be noted that the inverted frusto-conical wall 74, the radial annulus 72 and the cylindrical wall 70, all making up the sealing element 66, are made of an elastomeric material, suitably rubber, and properly compounded, which mechanically provides a wiping seal that is self-energizing in nature without developing undue frictional forces. In this regard, it will be noted that pressure on the bottom side of the secondary engine wall 64 will be effective to push the inverted frusto-conical wall radially inwardly, and as this action takes place, a more positive seal is provided between the inner periphery of the inverted frusto-conical wall and the exterior of the metering valve 12. Thus the self-energizing feature.

At this point, another unique feature of the present invention should be brought out in that when engine operating temperature is approached and the metering valve 12 begins to move, it moves in a cooperative direction with the direction of the inverted frusto-conical wall 74 to provide a smooth and low friction operational movement. Thus, quick thermal response of the unit of the present invention is provided.

Thus, although a low friction operation is provided, the frusto-conical wall provides nevertheless such an efficient seal by self-energization of the seal that fluid flowing to the radiator, that is along the top of the secondary engine wall 64, will not be returned between the frusto-conical wall 74 and the metering valve 12. Still further, when the metering valve 12 reverses its direction to approach the disc 14 and close off flow to the radiator, the frusto-conical wall 74 will provide a resilient sliding action and highly effective seal, yet without hindering the reverse movement of the valve element 12.

The Self-Contained Sleeve and Seal Embodiment of Figures 6-7

In another embodiment of the invention, the sealing element at the secondary engine wall can be carried by a unitary thermostat assembly itself, and such embodiment will now be described.

The self-contained sleeve and seal structure of the present invention is illustrated in FIGURES 6-7 of the drawings, and as there shown, will be found to contain the same general array of parts as previously described, with the addition among others of a seal-supporting bridge structure extending upwardly around the metering valve 12, as contrasted to providing the seal within the secondary engine wall 64 of the embodiment of FIGURES 1-5. Although the same general array and cooperative relation of parts is provided, it will be noted as the description develops that the configuration of some of the parts is slightly different, and therefore, for greatest clarity, it is preferred to utilize new reference numerals for such parts.

Accordingly, as shown in FIGURE 6, the base of the unit is provided by an annular support ring 76 having a plurality of four support spokes 78 extending radially inwardly to support a coaxial hub 80 having a coaxial bore 82 therethrough to accommodate sliding movement of the sleeve 46 of the power element 48, the latter having been previously descrbed. The annular support ring 76 is provided on its outer periphery with a groove 84 to retain the support bridge as will be hereinafter described.

The Seal Support Bridge

As shown in FIGURE 6, the support bridge is designated by the general reference numeral 86 and comprises a generally frusto-conical wall 88 having a plurality of flow apertures 90 formed therethrough. At the bottom of the frusto-conical wall 90, a radially extending, annular step 92 is provided that blends with a cylindrical or tubular wall 94 which is, during assembly of the unit, rolled into the groove 84 to provide an interlock for support on the annular support ring 76. From the base of the cylindrical wall 94 a radially extending annular flange 96 extends outwardly to form a base for attachment of the unit to the engine. Such attachment will be subsequently described.

The top of the frusto-conical wall 88 blends into a radially, inwardly-extending annular support shoulder 98.

The Seal

It is upon this radial inward support shoulder 98 that the pliable sealing element, equivalent to the elastomeric sealing element 66 of the FIGURES 1-5 embodiment is supported for operation. In this embodiment of the invention, the seal element is designated 100 and is of annular configuration and provided with axially-spaced flanges 102 and 104 between which there is formed a radially extending annular groove 106 by which the unit is retained upon the support shoulder 98 of the support bridge 86. It will be noted that the interior wall of the seal element 100 is of inverted frusto-conical configuration, terminating at the bottom in an annular wiping lip 108, similar in configuration and function to the inverted frusto-conical wall 74 and lip 75 of the FIGURES 1-5 embodiment. The wiping lip 108 or seal is adapted readily to accommodate axial sliding movement of the metering valve 12 in the same manner as previously described, remaining pliable and operating without sticking or adhering to the member 12. These properties are imparted through proper compounding of the rubber and mechanically a wiping seal which is self-energizing without developing undue frictional forces is provided.

The Remaining Components

The remainder of the components of the unit are substantially identical to those previously described for the FIGURES 1-5 embodiment. Thus, the hub 80 of the annular support ring 76 includes diametrically-opposed radially-extending lugs 24 with undercuts 26 to hold the ends 28 of straps 30 by the openings 32. Fastening of the bight portion of the strap 30 to the disc 14 at the top of the unit is somewhat different from the FIGURES 1-5 embodiment by utilizing a combination double-shouldered, hollow rivet 110 that is threaded centrally to receive the threaded upper end of the piston 54. The power element 48 is as previously described, and the same type of spring 40 surrounds the sleeve 46 and piston 54 of the power element to bear against the hub 44 of the metering valve 12 to provide return action with radially extending spokes 42 supporting the valve 12.

Thus, expansion of the pellet 55 of the power element 48 causes the sleeve 46 and metering valve 12 to move downwardly away from the disc 14, providing an opening to the radiator at 112 and simultaneously closing off the gap 114, thus stopping by-pass to the engine and directing heated liquid to the radiator (not shown) for proper operation.

Installation of the Unit

Installation of the unit is generally analogous to the embodiment of FIGURES 1-5 but fitment of the seal element 100 is distinguished. Thus, the unit is inserted through a hole 116 of primary engine wall 118 with the flange 96 fitting into a receiving annulus of mating configuration; thereafter a retainer 120 is secured in place to provide secured installation.

It will be noted that when the unit is inserted through the primary wall 118, it also goes through an aligned opening 122 in secondary wall 124. This movement causes the top surface of the seal element 100 to abut in sealing relation with the bottom side of the wall 124, as distinguished from the cemented seal between opening 68 and seal unit 66 in FIGURE 2.

OPERATION

Coolant flowing from the engine around the power element 48 in the direction of the arrow 126 in the closed position of FIGURE 6 will be by-passed through the openings 90 of the bridge structure 86 back to the engine as indicated by the by-pass arrow 128. When the coolant temperature reaches an appropriate point (range), the metering valve 12 moves downwardly through the seal 100, past the wiping lip 108 to provide an opening at 112, permitting flow to the radiator in the same manner described hereinbefore for the FIGURES 1-5 embodiment.

However, it will be noted that in this embodiment of the invention the structure is entirely self-contained, and thus no expense is imposed upon the engine manufacturer to provide a seal as in the embodiment of FIGURES 1-5, with tolerance requirements, etc. Further, replacement will be facilitated, because the mechanic will not be required to reach in and remove the seal from the secondary engine wall as in the FIGURES 1-5 embodiment, or replace the same. In the present embodiment, withdrawal of the unit automatically withdraws the seal and replacement of the seal or a new unit will overcome any leakage problems that might develop.

The Air Vent Modification

As shown in FIGURES 6 and 8, and as more particularly described with reference to FIGURE 8, an air vent and liquid control valve 130 is provided in the disc 14 to permit trapped air to be released to the radiator and thereafter close to prevent liquid leakage and a cold engine. More particularly, a hole 132 is provided in disc 14 between the strap 30 and valve element 12 to accommodate the pin portion 134 of the valve unit 130; note that the pin portion 134 is of lesser diameter than the hole 132 to permit fluids to pass through the annular gap between pin 134 and hole 132. The pin 134 is swaged at the top as at 136 to retain the unit in position. The bottom end of the unit 130 is formed as a thickened disc 138 with a flat upper surface to abut the bottom side of the wall 14 in liquid seal relation upon venting of air and the beginning of liquid flow therethrough to draw it to a closed position. As shown in FIGURE 8, a dry position is illustrated, and the thickened disc 138 has dropped away.

The pin portion 134 as shown in FIGURE 6 may also be peened as at 140 for assembly. It may be preferred to use the swaged configuration of FIGURE 8 for freer flow characteristics; however, either set-up will provide operability in accordance with the present invention.

EXTENDED SCOPE OF INVENTION

From the foregoing it will be understood that the seal between the engine and the radiator conduit can be carried either by an engine wall or by the thermostat itself, to provide a unique thermostatic flow control system.

ADVANTAGES OF THE INVENTION

From the foregoing it will be obvious that a liquid control thermostat of improved functionality and simplified construction is provided in accordance with the present invention.

In the structure herein described, all materials are adapted to withstand the effects of water and solutions containing alcohol, ethylene-glycol and soluble oils utilized in engine coolants. Thus long life and reliable operation are assured.

Another important advantage of the invention resides in the broad operating range provided by the power element. Usually operation in the range from 160–190° F. for automobile engine cooling is satisfactory; however, the limits of the present device will go beyond such range for other flow control applications where desired, to the full range limitations of the power element.

Although not shown on the drawings, a bellows could be used in place of the power element. Such system would involve charging the bellows with a suitable liquid, depending upon the temperature range desired. Thus, the adaptability of the present invention is quite broad.

A further advantage is the free action of the unit because of the design of the seal and the effective self-energizing, wiping lip feature thereof. This too will withstand media encountered for long life and efficient operation.

It will be noted from the foregoing description that the movement of the power element is ample to provide sufficient motion for the valve element 12, within the specified temperature range, to provide a large flow opening having free-flow characteristics with very little back pressure. Also, the large and powerful spring utilized provides quick closing and thus highly-satisfactory operations and maintenance of optimum engine operating temperatures.

The above description has proceeded on the basis of specific practical embodiments of the invention. However it will be appreciated that minor changes in form and parts relation can be made without departing from the spirit of the invention as set forth in the appended claims.

I claim:
1. In a thermostatic liquid flow control system,
a first fluid retaining wall,
a second fluid retaining wall spaced from said first wall,
said walls being fixed with respect to each other,
said walls having coaxial openings,
first and second spaced valve seats,
a tubular open-ended valve element axially movable in the space between said valve seats to close against one or the other of said seats,
thermostatic means, comprising an actuating rod connected to said second valve seat and extending toward said first seat,
a sleeve slidably mounted on said actuating rod,
and heat-responsive power means connected at one end to said sleeve to relatively move said sleeve and rod,
means connecting said sleeve to said valve element for simultaneous movement,
means biasing said valve element toward said second seat,
means retaining said first valve seat in the opening of said first fluid-retaining wall with said tubular valve element extending through said opening of said second fluid-retaining wall, and said second valve seat fixedly positioned beyond said opening of said second wall,
and an elastomeric seal element positioned between said tubular valve element and said second fluid-retaining wall.

2. In a thermostatic liquid flow control system,
a first wall,
a second wall spaced from said first wall,
and said walls having aligned openings therein,
an apertured base positioned within the opening of said first wall and defining a first annular valve seat,
an impervious wall positioned beyond said opening of said second wall and defining a second valve seat,
means extending from said base to support said impervious wall,
a hollow open-ended valve element axially movable in the space between said valve seats to close against one or the other of said seats,
thermostatic power means operably connected to said hollow valve element to move the valve element between said valve seats,
said power means operably connected to said second valve seat,
said valve element extending through the opening in said second wall,
means biasing said valve element toward said second seat,
an elastomeric seal member supported in said opening of said second wall and between said wall and said valve member to provide a sliding seal,
and said seal member having a frusto-conical wall terminating in an annular wiping lip directed toward said first wall.

3. In a thermostatic liquid flow control system,
first and second spaced end aligned walls,
said walls having aligned openings therethrough,
a first valve seat member positioned within the opening of said first wall,
a second valve seat member positioned beyond said second wall and in alignment with said first valve seat,
means extending from said first valve seat member to support said second valve seat member,
a hollow open-ended valve element axially movable in the space between said valve seats to close against one or the other of said seats,
thermostatic power means operably connected to said hollow valve element to move the valve element,
said power means operably connected to said second valve seat,
said valve element extending through the opening in said second wall,
means biasing said valve element toward said second seat,
and a seal element positioned between said tubular valve element and said second wall and slidable relative to said valve element.

4. In a thermostatic valve,
first and second spaced walls defining first and second spaced valve seats,
means connecting said walls to maintain them in spaced relation to each other,
a hollow open-ended valve element axially movable in the space between said valve seats to close against one or the other of said seats,
means biasing said valve element toward one of said seats,
thermostatic power means operably connected to said valve element to move the same between said seats,
said power means operably connected to one of said valve seats,
a bridge member connected to one of said seats, and surrounding at least part of said valve element,
an annular seal element supported by said bridge member in slidable relation around the periphery of said valve element,
and means retaining said seal in said position.

5. In a thermostatic valve,
first and second spaced walls defining first and second spaced valve seats,
means connecting said walls to maintain them in spaced relation to each other,
a hollow, open-ended valve element axially movable in the space between said valve seats to close against one or the other of said seats,
thermostatic means, comprising
a rod connected to said second wall and extending toward said first wall,
a sleeve slidable on said rod,
and heat-responsive power means connected at one end to said sleeve to relatively move said sleeve and rod,
means connecting said sleeve and valve element for cooperative movement,
means biasing said valve element towards said second wall,
an annular seal element positioned in slidable relation around the periphery of said valve,
and means extending from said first wall to support said seal.

6. In a thermostatic valve,
a first annular wall defining an annular valve seat and having a support spider therein,
a disc spaced from said first wall and fixedly supported therefrom in axial alignment to define a second valve seat,
a hollow elongated open-ended valve element axially movable between said valve seats to close against one or the other of said seats,
thermostatic means, comprising
a rod connected to said disc and extending toward said first wall,
a sleeve slidable on said rod,
and heat-responsive power means connected at one end to said sleeve to relatively move said sleeve and rod,
means connecting said sleeve and said valve for joint movement,
means biasing said valve toward said disc,
an annular bridge member connected to said first annular wall and extending axially to surround at least part of said valve element,
and an annular elastomeric sealing element supported on said bridge in surrounding slidable relation to said valve.

7. In a thermostatic liquid flow control system,
first and second spaced walls having aligned openings, said walls being fixed with respect to each other,
a thermostatic valve, comprising
first and second spaced valve seats,
a hollow, open-ended valve element axially movable between said valve seats to close against one or the other of said seats,
means biasing said valve element toward said second seat,
thermostatic power means positioned adjacent said first seat and operably connected to said valve element to move the same,
said power means operably connected to said second seat,
said first seat being positioned within the opening of said first wall and said second seat positioned beyond said opening of said second wall with said valve element extending through the opening of said second wall,
an annular seal element positioned in slidable relation around the periphery of said valve element,
and means extending from said first seat to support said seal and also retain the same in contact with said second wall.

8. In a thermostatic valve,
first and second spaced walls defining first and second spaced valve seats,
means connecting said walls to maintain then in spaced relation to each other,
a hollow, open-ended valve element axially movable in the space between said seats to close against one or the other of said seats,
thermostatic means, comprising
a rod connected to said second wall and extending toward said first wall,
and a sleeve slidably mounted on said rod,
and heat-responsive power means connected at one end to said sleeve to relatively move said sleeve and rod,
means connecting said sleeve to said valve,
and means biasing said valve toward said second wall.

9. In a thermostatic valve,
first and second spaced walls defining first and second spaced valve seats,
means connecting said walls to maintain then in spaced relation to each other,
said second wall comprising a plate,
a hole in said plate,
a valve stem of lesser diameter than the hole and extending therethrough,
a hole closure carried on said stem on the first wall side of said plate,
means on the other end of said stem retaining the same for free axial movement in said hole,
a hollow open-ended valve element axially movable in the space between said seats to close against one or the other of said seats,
thermostatic means, comprising
a rod connected to said second wall and extending toward said first wall,
a sleeve slidable on said rod,
and heat-responsive power means connected at one end to said sleeve to relatively move said sleeve and rod,
means connecting said sleeve to said valve,
and means biasing said valve toward said first wall.

References Cited in the file of this patent

UNITED STATES PATENTS

| | | |
|---|---|---|
| 2,584,877 | Hoffman et al. | Feb. 5, 1952 |
| 2,847,165 | Freismuth | Aug. 12, 1958 |
| 3,004,710 | Couffer et al. | Oct. 17, 1961 |

UNITED STATES PATENT OFFICE
CERTIFICATE OF CORRECTION

Patent No. 3,129,885                April 21, 1964

John S. Freismuth

It is hereby certified that error appears in the above numbered patent requiring correction and that the said Letters Patent should read as corrected below.

Column 1, line 62, for "elevattional" read -- elevational --; column 2, line 14, for "of" read -- to --; column 3, line 60, for "thermostat" read -- thermostatic --; column 4, line 22, for "112" read -- 12 --.

Signed and sealed this 1st day of September 1964.

(SEAL)
Attest:

ERNEST W. SWIDER
Attesting Officer

EDWARD J. BRENNER
Commissioner of Patents